No. 855,977. PATENTED JUNE 4, 1907.
R. H. PURNELL.
COMBINED COTTON CHOPPER AND CULTIVATOR.
APPLICATION FILED DEC. 1, 1906.
4 SHEETS—SHEET 1.
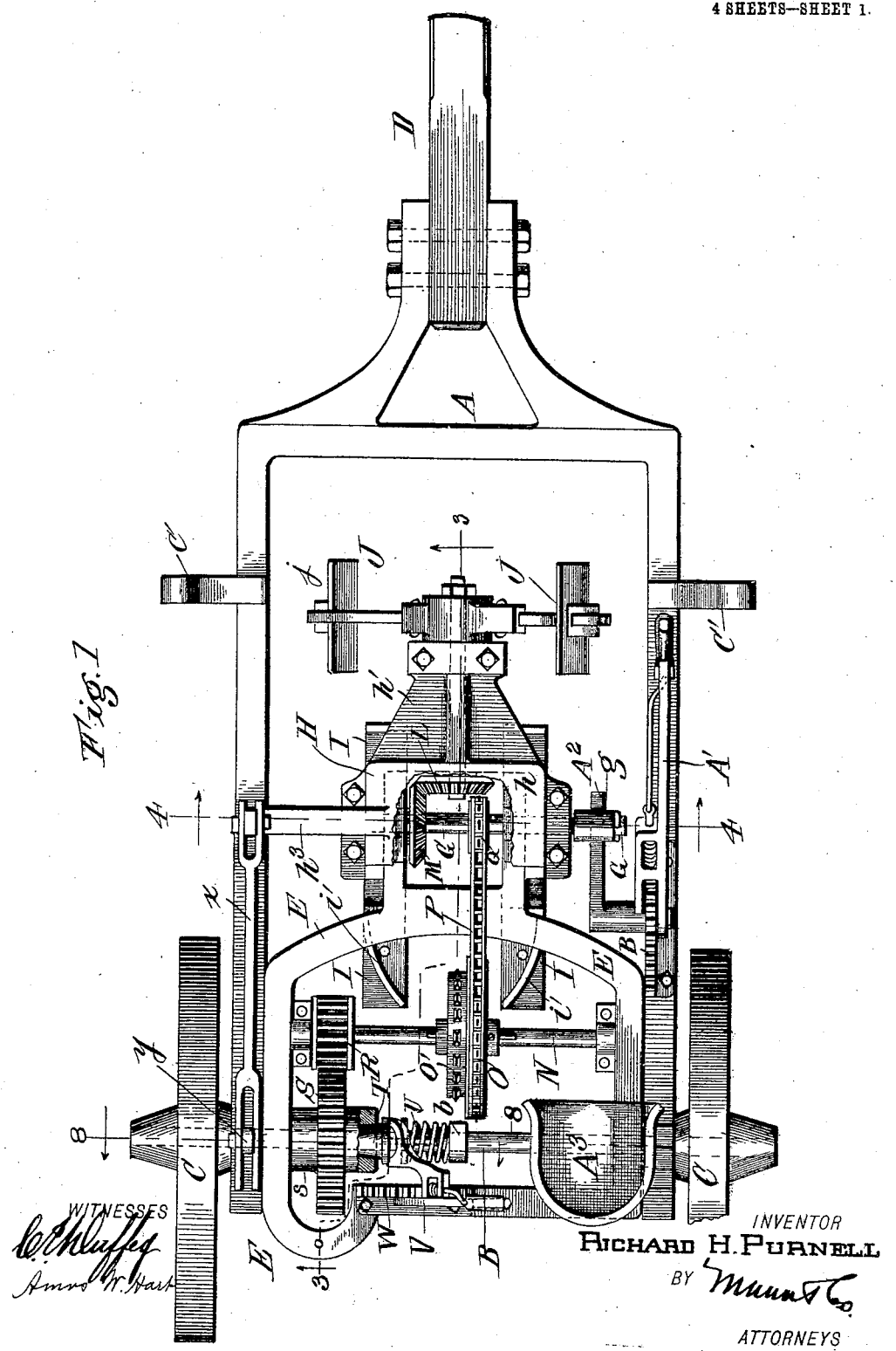
WITNESSES
INVENTOR
RICHARD H. PURNELL
BY
ATTORNEYS

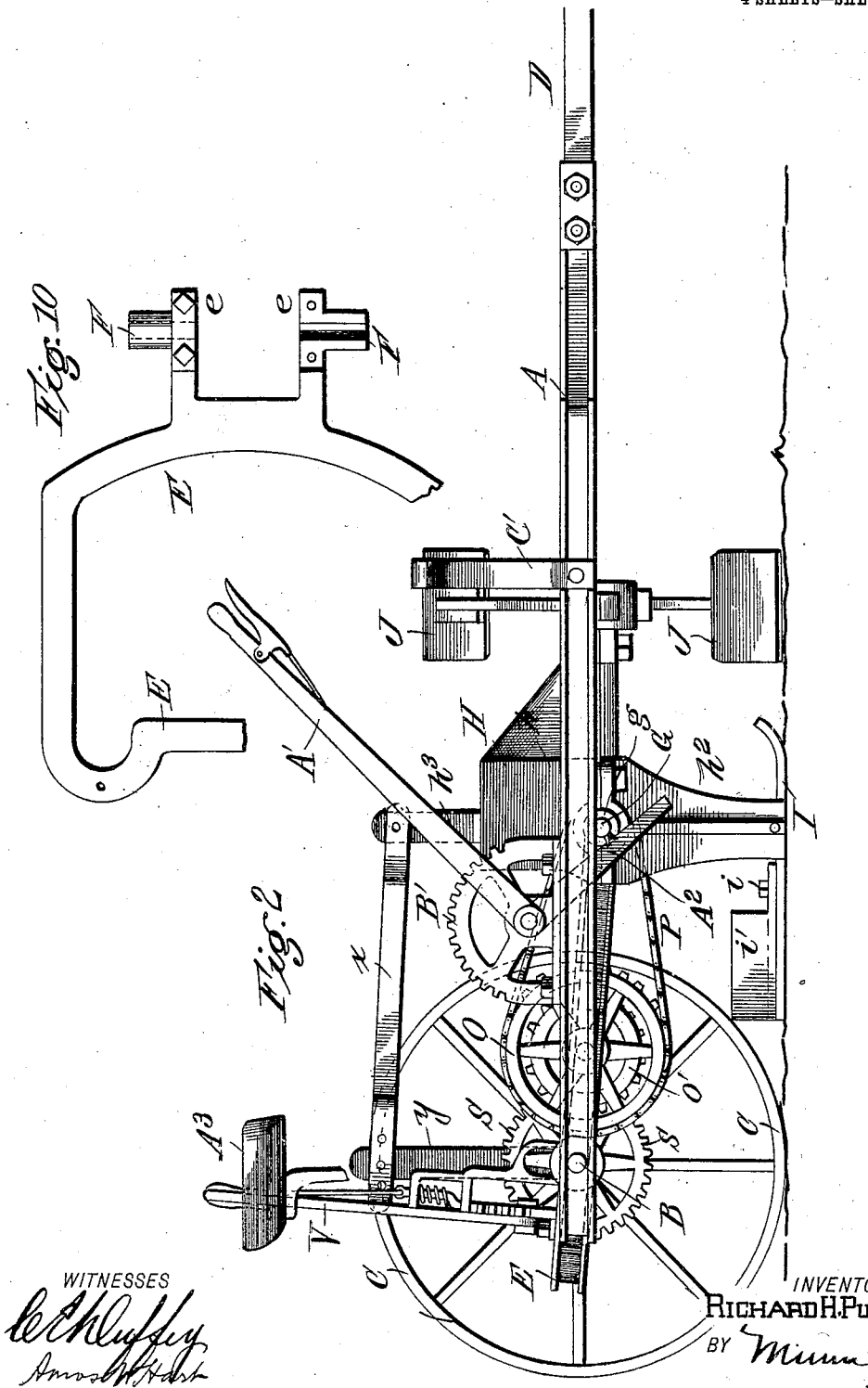

No. 855,977. PATENTED JUNE 4, 1907.
R. H. PURNELL.
COMBINED COTTON CHOPPER AND CULTIVATOR.
APPLICATION FILED DEC. 1, 1906.
4 SHEETS—SHEET 3.
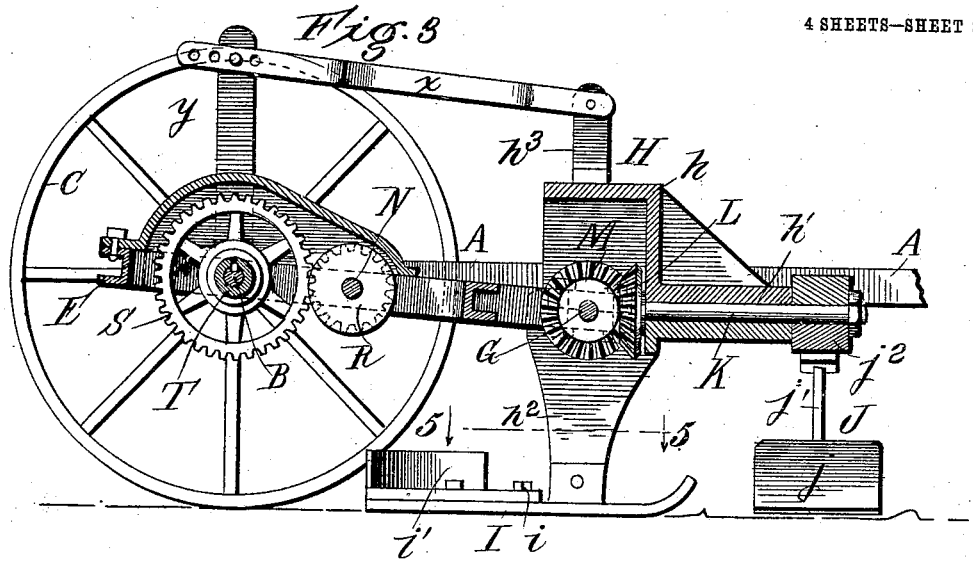
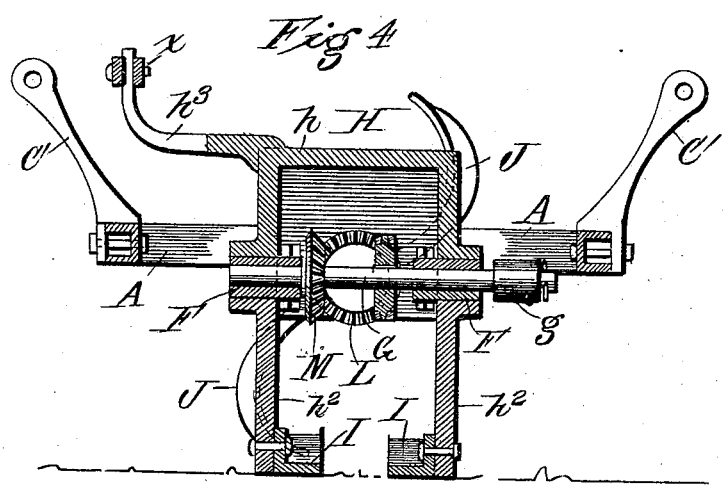
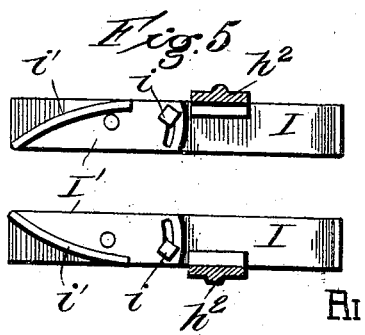
WITNESSES
INVENTOR
RICHARD H. PURNELL
BY
ATTORNEYS No. 855,977. PATENTED JUNE 4, 1907.
R. H. PURNELL.
COMBINED COTTON CHOPPER AND CULTIVATOR.
APPLICATION FILED DEC. 1, 1906.
4 SHEETS—SHEET 4.
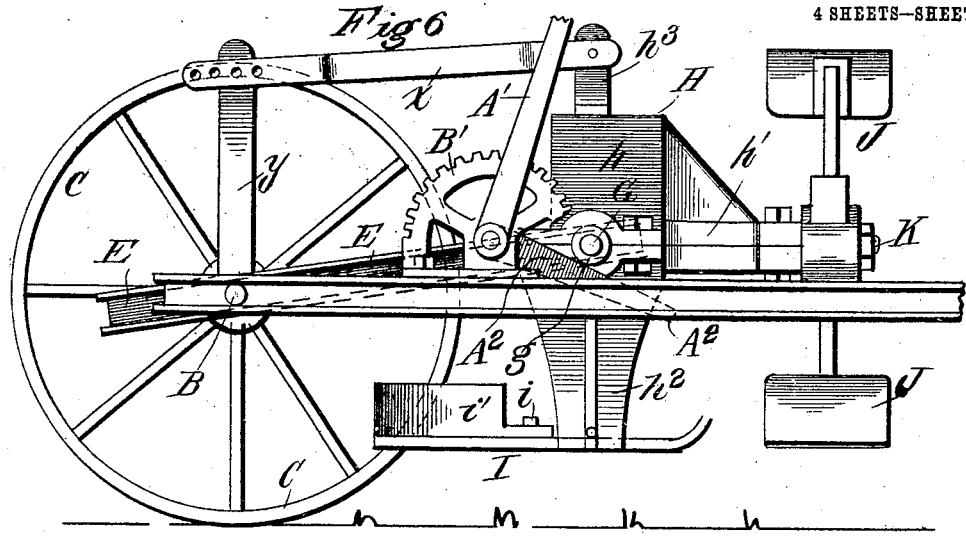
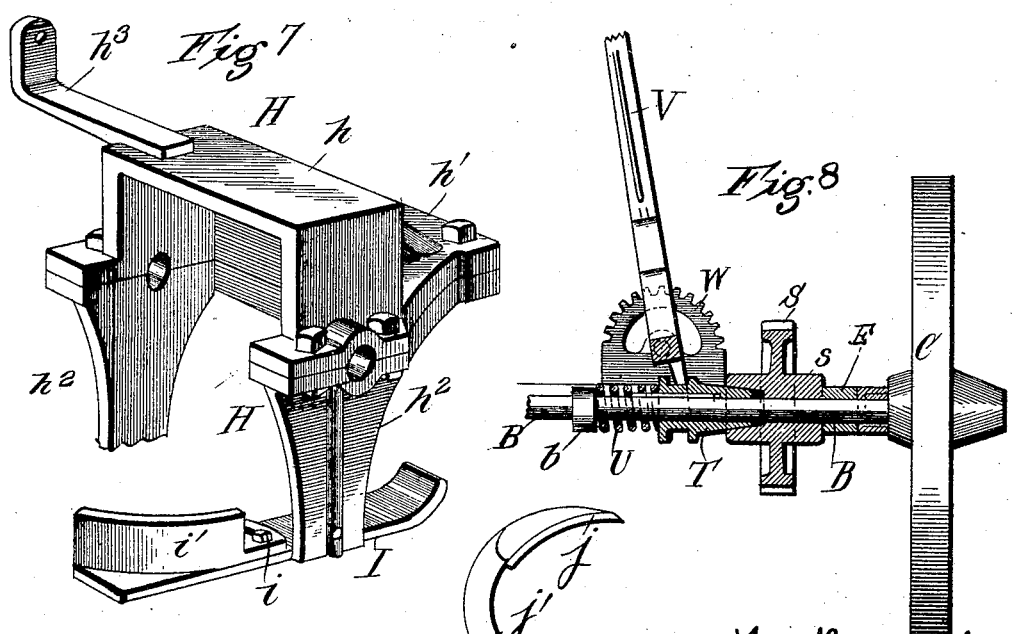
WITNESSES
INVENTOR
RICHARD H. PURNELL
BY
ATTORNEYS

UNITED STATES PATENT OFFICE.

RICHARD HOPE PURNELL, OF ROSEDALE, MISSISSIPPI.

COMBINED COTTON CHOPPER AND CULTIVATOR.

No. 855,977.  Specification of Letters Patent.  Patented June 4, 1907.

Application filed December 1, 1906. Serial No. 345,870.

*To all whom it may concern:*

Be it known that I, RICHARD HOPE PURNELL, a citizen of the United States, and resident of Rosedale, in the county of Bolivar and State of Mississippi, have invented a Combined Cotton Chopper and Cultivator, of which the following is a specification.

My invention is an improved machine for chopping, or cutting out, cotton rows at regular intervals, and also for throwing dirt up to the plants which remain standing.

The details of construction, arrangement, combination, and operation of parts are as hereinafter described, and illustrated in the accompanying drawing, in which Figure 1 is a plan view of the machine, portions being broken away to illustrate interior construction. Fig. 2—Sheet 2—is a side view of the machine. Fig. 3 is a longitudinal section on the line 3—3 of Fig. 1. Fig. 4 is a vertical cross section on the line 4—4 of Fig. 1. Fig. 5 is a horizontal section on the line 5—5 of Fig. 3. Fig. 6 is a side view of the main portion of the machine showing the chopping and cultivating devices raised as when out of action. Fig. 7 is a perspective view of the pivoted frame to which the runners and dirters, or cultivating devices, are attached and in which the shaft of the rotary chopper has its bearings. Fig. 8 is a detail section on the line 8—8 of Fig. 1. Fig. 9 is an end view of the chopper and the head to which the choppers proper are attached. Fig. 10—Sheet 2—is a plan view of the main portion of the supplemental frame arranged within the main frame.

The frame A of the machine—see especially Fig. 1—is an oblong rectangle, the same being open at the rear where it is mounted upon the axle B, to which running wheels C are keyed so as to revolve therewith. A tongue D is rigidly attached to the front portion of the frame. The latter may be constructed of channeled- or T-iron so as to combine maximum strength and lightness. A supplemental frame E—see Figs. 1 and 10, Sheet 2—is arranged within the rear portion of the main frame A and mounted and supported at its rear end on the axle B, the latter being free to turn therein. Parallel arms $e$ project from the front side of this frame E, and bearings F—see Figs. 4 and 10—are provided therein for reception of a transverse shaft G. The laterally projecting bearings, or boxes, F, constitute the journal boxes of a frame H which is shown detached in Fig. 7. The same consists of a hood $h$ with front projection $h'$ and vertical pendent legs $h^2$ to which runners I are rigidly attached. These legs, with a forwardly projecting portion underlying the part $h'$, are bolted to the upper part $h'$, and the boxes F of the shaft G are held between the said parts, as will be readily understood. The shaft G forms the pivot of this frame H, the shaft having its bearings in the boxes F of supplemental frame E. Aside from this function, the shaft G serves as an intermediary for transmitting rotation to the chopper J, which, as shown in Figs. 1 and 3, is mounted upon the front end of a shaft K having its bearings in the front portion $h'$ of the vertical frame H. A bevel gear L is keyed on the inner end of said shaft K and meshes with a corresponding gear M, which is in turn keyed on the transverse shaft G. It is obvious that if the shaft G be rotated, corresponding rotation will be imparted to the chopper J. Such rotation is imparted from a driving shaft N—see Figs. 1 and 3— which is arranged in front of, and parallel to, the axle B. A sprocket wheel O is mounted on such shaft N, and a chain P runs therefrom to a smaller sprocket pinion Q, keyed on the shaft G—see especially Fig. 1.

In order that the speed at which the chopper J is driven may be varied, a second sprocket wheel O' of smaller diameter, is arranged alongside the sprocket wheel O, and both are mounted upon the same hub, which is splined to the shaft N, and provided with a clamp-screw so that the two may be adjusted together laterally as required to bring either into line with the sprocket pinion Q on the shaft G. The shaft N is driven from the axle B, and for this purpose a spur pinion R is keyed on the shaft and meshes with a spur gear fixed on a hub $s$ which is adapted to rotate loose on the axle. For locking the gear S with the axle, so as to rotate therewith, and thus impart the desired rotation to the chopper J through the intermediary mechanism already described, I employ a friction clutch illustrated in Figs. 1 and 8. The clutch-member T slides on a feather, and its tapered end is adapted to enter a corresponding socket in the hub $s$ of the gear S. A spiral spring U is interposed between this clutch cone and a collar $b$ on the axle B and tends to hold the cone normally engaged with the gear S. A hand lever V is pivoted to a segment W on the rear portion of the supplemental frame E, and provided with a spring dog by which it may be locked to said segment for holding the clutch cone T out of engagement with the gear S, or for pressing it firmly into engagement therewith, as conditions may require. As shown in Fig. 1, the said lever V is provided with a lateral arm whose forked end engages a circumferential groove of the clutch cone T.

In order to hold the pivoted swinging frame H in vertical position, so that the runners I will be held practically in horizontal position, I connect it by a bar X—see Figs. 1 and 6—with a rigid vertical arm Y forming an attachment of the main frame A, and arranged over the rear axle. The forward end of the connecting bar X is pivoted to an arm $h^3$ which extends laterally from the frame H. The rear end of the bar X is forked and provided with a number of perforations to receive a pin which pivots it to the vertical rigid arm Y. Cotton rows usually run from a level to 14 inches high, and consequently the plane of the row is constantly changing. The connection between the bar X and the rigid arm, Y, may be changed by means of the perforations in the bar, and it is obvious that this enables the supplemental frame and the pivoted frame H which carries the chopper J, to be raised or lowered relative to the frame A. The front end of the latter is supported by the tongue bearing in the neck-yoke, and consequently rises or falls to a slight extent if the ground be uneven or rolling. The runners I, when the machine is in use, will always rest and travel upon the ground, and if the animals composing the team be large, or tall, it is obvious that the front end of the frame will be held higher than if the team be small, and consequently the bar X may be adjusted to allow for such difference, to insure the runners traveling on the ground. By this means it is insured that the chopper J will strike the row of plants squarely, so to speak, or at right angles thereto.

The chopper is formed of two curved hoes $j$—see Fig. 9—which are attached to curved shanks $j'$ having a series of perforations and being inserted in sockets formed at opposite points on a hub $j^2$. The latter, as shown in Figs. 1 and 3, is keyed on the shaft K, so as to revolve therewith as before stated. A pin passes through the hub and the shanks of the choppers so that the latter are held in due position but may be adjusted outward or inward to practically increase or lessen the diameter of the circle described by the hoes $j$. The runners I are flat and relatively narrow metal plates arranged parallel and turned upward at their front ends. Upon the portions thereof which project in rear of the legs $H^2$ of the frame H, are pivoted coverers, or what are sometimes called "dirters," I', the same consisting of flat plates having vertically inwardly curved flanges. The front ends of the plates I' are provided with an arc slot, and a clamp screw $i'$ passes through the same and serves to secure the plates in any adjustment on their pivots. In other words, the curved flanges may be adjusted toward each other or farther apart, according to the conditions; that is to say, to cause them to throw more or less dirt inward toward the growing plants.

In order to raise the chopper J and the runners I, with their attachments, from the ground or hold them out of action, I employ a lever A'—see Figs. 1, 2, and 6—the same being pivoted to a toothed segment B' which is fixed on one side of the frame A. This lever has a shorter arm $A^2$ which projects forward at nearly a right angle to the longer member, and when the lever is swung backward, this arm engages the projecting end of the shaft G—see especially Fig. 1. A rotatable sleeve $g$ is arranged on this shaft to reduce friction between the latter and the member $A^2$ of the lever. The latter may be locked to the segment by a spring dog, as will be readily understood. This lever, like the lever V on the rear part of frame E, is easily accessible to the driver from his seat $A^3$—see Figs. 1 and 2.

In Figs. 1 and 4 are shown arms C', which are rigidly attached to, and extend upward and outward from, the front portion of the main frame A, and are provided with holes through which the guide lines for the team are passed.

I claim:

1. The improved cotton chopper and cultivator, comprising a frame having a tongue rigidly attached, a rear axle upon which the frame is mounted, running wheels keyed on said axle, a supplemental frame arranged within the main frame and journaled upon the axle, a third vertically swinging frame pivoted to the supplemental frame, a rotary chopper having a shaft which is journaled in the swinging frame, means for holding such swinging frame practically vertical, runners attached to the swinging frame and adapted to slide upon the ground, and means for imparting rotation from the axle to the chopper, substantially as described.

2. The improved cotton chopper and cultivator, comprising a main frame having a rigid tongue, an axle upon which the said frame is supported at its rear, running wheels keyed on the axle, a spur gear mounted loose on the axle, a splined clutch member arranged for locking the spur gear with the axle, a supplemental frame pivoted within the main frame, and adapted to swing vertically, a third frame which is pivoted to such supplemental frame and swinging vertically independent thereof, means connecting the swinging frame with the main frame, whereby it is held practically vertical whatever be the elevation of the supplemental frame, a rotary chopper and its shaft journaled in the swinging frame, a transverse shaft journaled in the swinging frame, bevel gearing connecting it with the chopper shaft, a driving shaft which is geared with the gear on the axle, and sprocket mechanism for imparting rotation from the driving shaft to the shaft which drives the chopper, substantially as described.

3. In a combined cotton chopper and cultivator, the combination, with the main frame, and a supplemental frame, both mounted upon an axle having wheels keyed thereon, of a third frame which is pivoted to the front portion of the supplemental frame, a connecting bar pivoted to rigid portions of the main frame and the said swinging frame, whereby the latter is held practically vertical when the supplemental frame is raised or lowered, a rotary cotton chopper, and the shaft thereof journaled in the swinging frame, means for imparting rotation to the chopper from the axle, and runners adapted to travel on the ground and forming an attachment of the swinging frame, substantially as described.

4. The combination, with the main frame, the rear axle and running wheels keyed thereon, of the supplemental frame journaled within the main frame, a third swinging frame journaled on the front portion of such supplemental frame, and means for connecting it with the main frame whereby to preserve a practically vertical position in any adjustment of the supplemental frame, a rotary chopper having a shaft journaled in the swinging frame, and means connecting it with the axle, whereby, as the machine advances, rotation is imparted to the chopper, substantially as described.

5. The combination, with the main frame, the rear axle, and a supplemental frame journaled thereon, and adapted to swing vertically at its free end, a frame pivoted to and carried by the front end of the supplemental frame, and devices connected with the lower end of the same, which are adapted to throw dirt laterally as the machine advances, substantially as described.

6. The combination, with a main frame, the rear axle having wheels keyed thereon, and a supplemental frame journaled on said axle, runners secured to pendent portions of the supplemental frame and adapted to travel on the ground, and plates pivoted to the rear portions of said runners and having vertical, inwardly curved flanges, and means for securing the plates in any lateral adjustment, whereby the distance between the flanges may be increased or lessened as conditions require, substantially as described.

7. The combination, with a main frame, the axle, and wheels keyed thereon, of a supplemental frame journaled on the axle and arranged within the main frame, a swinging frame attached to the front portion of said supplemental frame, a shaft passing through the two and thus forming the pivot of the swinging frame, means connecting the latter with the main frame whereby it is held normally vertical in different vertical adjustments, a rotary chopper arranged on the front of the swinging frame and having a shaft extending backward therein, means for operatively connecting such shaft with the axle, whereby the chopper may be rotated, clutch mechanism on the axle and supplemental frame for engaging such mechanism with and disengaging it from the axle, runners attached to the pendent portions of the swinging frame, a lever pivoted on the main frame and having an arm extended downward and engaging a part projecting from the swinging frame, and a segment with which said lever may be locked, as shown and described.

8. The combination, with a main frame and pivoted supplemental frame, of the swinging frame H formed of two parts bolted together, a transverse shaft which pivots the swinging frame on the supplemental frame, the boxes for such shaft being arranged between the two parts of the swinging frame, a rotary chopper which is geared with such shaft, and means connected with the axle for driving said shaft, substantially as described.

RICHARD HOPE PURNELL.

Witnesses:
W. G. HURDLE,
CHAS. CLARK.